UNITED STATES PATENT OFFICE.

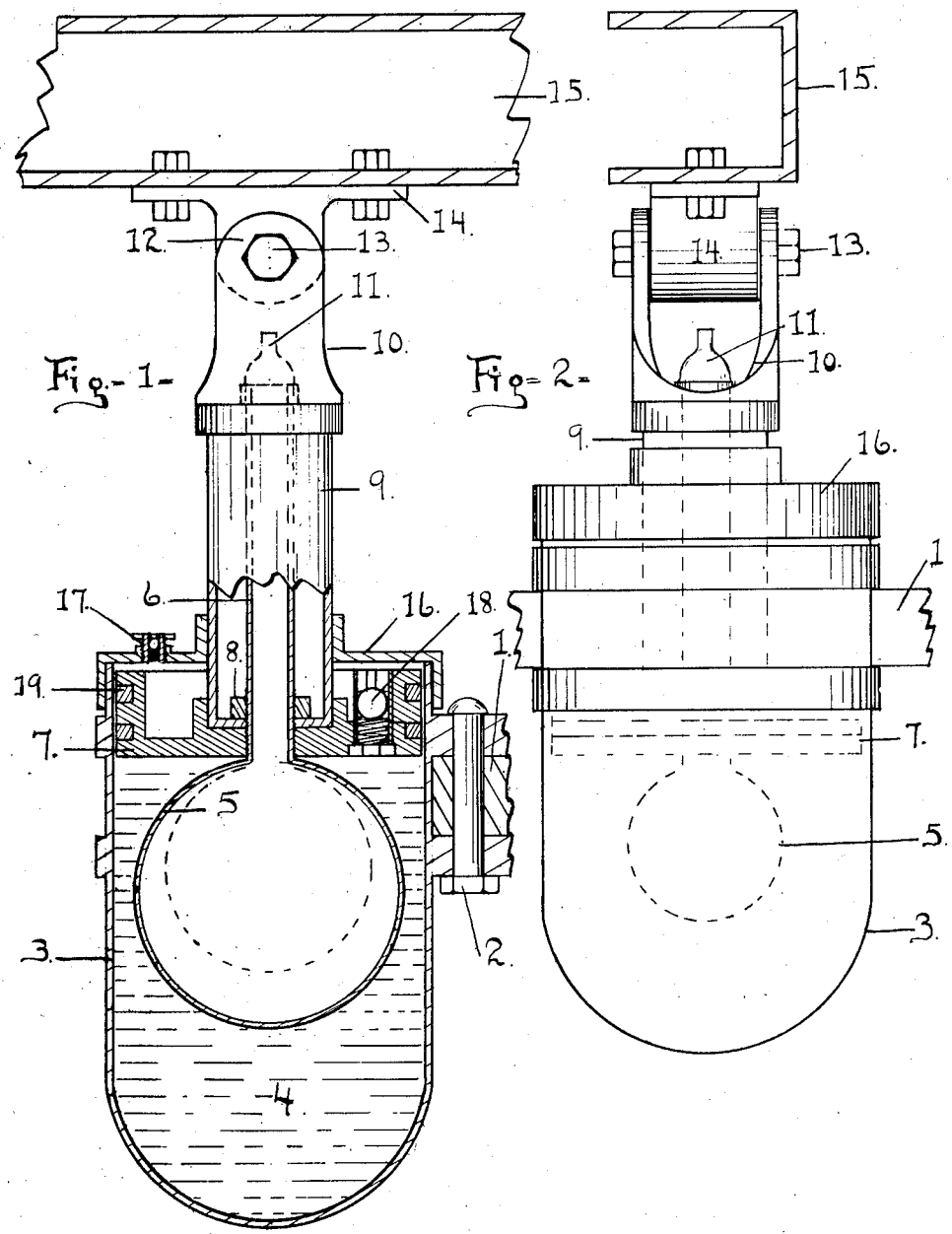

JESSE D. LANGDON, OF WATERVILLE, WASHINGTON.

HYDRAULIC AIR-CUSHION.

1,350,414.　　　　Specification of Letters Patent.　Patented Aug. 24, 1920.

Application filed April 1, 1918. Serial No. 226,052.

*To all whom it may concern:*

Be it known that I, JESSE D. LANGDON, a citizen of the United States, residing at Waterville, in the county of Douglas and State of Washington, have invented certain new and useful Imprivements in Hydraulic Air-Cushions; and I do hereby declare the following to be a full, clear, and exact description of the invention, such as will enable others skilled in the art to which it appertains to make and use the same.

The present invention relates to shock absorbers or cushioning means, and aims to provide such a device to supplant springs and similar devices now used, by utilizing an air cushion and hydraulic means for compressing said air cushion, in order to obtain a yielding action as good if not superior to the action of a spring.

Another object is the provision of a hydraulic liquid chamber adapted to be reduced and enlarged by the relative motion of the two parts between which the device is located, such as the body and axle of a vehicle, in combination with an air cushion within said chamber permitting the chamber to be reduced in size and yieldingly resisting such action so as to obtain the yielding action with little friction.

A further object is the provision of such a device embodying a cylinder and piston for compressing the liquid, and means whereby leakage of the liquid past the piston is reduced to a minimum, and any liquid returned to the liquid chamber which may escape therefrom.

A still further object is the provision of such a device embodying a novel construction and assemblage of the component elements in order to provide a comparatively simple and inexpensive, yet practical and efficient device for the intended purposes.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a longitudinal central section of the device, portions being shown in elevation.

Fig. 2 is a side elevation of the device looking at right angles to the line of view in Fig. 1 and showing the parts moved together.

In carrying out the invention, there is provided a cylinder 3 fastened by any suitable means, as at 2, to a vehicle axle 1 or other part of two relatively movable members which the device is disposed. A piston 7 is movable in the cylinder 3, and the hydraulic chamber between said piston and the opposite closed end of the cylinder is liquid tight and filled with oil or other liquid, as at 4, said piston 7 having the piston rings 19 to prevent leakage of the liquid past said piston.

Disposed within the liquid chamber and carried by the piston is an inflatable air container or bag 5 disposed within the liquid so as to displace same, and this container 5 has a tubular stem 6 extending through the piston 7, and provided at its outer end with a valve cap 11, permitting the container or bag 5 to be inflated with air.

A tubular piston rod 9 has one end secured to the piston 7, and a nut 8 threaded on the stem 6 secures the container 5 to the piston and also assists in securing the piston rod 9 to the piston, said rod 9 sliding through a cap 16 secured on the open end of the cylinder. A U-shaped member 10 is secured to the outer end of the piston rod 9 and is pivoted, as 13, to a block 14 that is secured to the frame 15 of the vehicle or other member movable relatively to the axle or member 1, whereby the motion of the members 1 and 15 toward and away from one another will move the piston and cylinder likewise. The member 10 has the ears 12 engaging the pivot 13.

The cap 16 has a check valve 17 permitting air to flow inwardly into the air chamber between the cap 16 and piston 7, but preventing the escape of air, and the piston has a check valve 18 permitting flow from said air chamber into the liquid chamber but not reversely.

In operation, when the piston and cylinder are moved toward one another so as to reduce the volume of liquid chamber, the liquid will be pressed against the walls of the air container 5, thereby compressing said container and the air therein, there being no chance for the air to escape as it is confined within an air tight inclosure. This compression of the air will permit of the yielding motion of the parts 1 and 15, and the air cushion thus provided will yieldingly resist such motion, and will return the parts after the strain has been removed. This not only permits a yielding motion equivalent to that of a spring, but also serves to absorb shocks. When the strain is removed, the air in expanding will enlarge the container or bag 5, and the pressure of the liquid 4 will therefore move the piston 7 and cylinder 3 apart.

When the piston 7 moves away from the cap 16, air is drawn in through the valve 17, and when the piston 7 returns toward the cap 16, this air is trapped within the air chamber and compressed, thus providing an air cushion for the parts when separated. This air cushion or air under pressure within the air chamber between the piston 7 and cap 16 will reduce to a minimum the leakage of liquid past the piston, because the air pressure will tend to force the liquid back into the liquid chamber, and any liquid which enters the air chamber is forced back through the valve 18 from the air chamber into the liquid chamber.

The outer end of the valve stem 6 of the air container or bag 5 is accessible through the opening of the member 10 so that the container can be inflated from time to time if necessary.

What is claimed as new is:

1. A device of the character described embodying a member having a liquid chamber and an opposite air chamber therein, a member movable in said member between and separating said chambers to reduce and enlarge said chambers, an inflatable compressible air container within said liquid chamber to be compressed by the reduction in volume in said chamber and by its expansion enlarging the volume of said chamber to separate said members, and means for permitting the flow of liquid from the air chamber past the second named member into the liquid chamber.

2. A device of the character described embodying a cylinder, a piston working therein, said cylinder having a liquid chamber at one side of the piston and an air chamber at the other side of said piston, means for admitting air into the air chamber and retaining it therein, a compressible air container in the liquid chamber, and means for permitting the flow of liquid from the air chamber past the piston into the liquid chamber.

3. A device of the character described embodying a cylinder, a piston working therein, said cylinder having a liquid chamber at one side of the piston and an air chamber at the other side of said piston, a compressible air container in the liquid chamber, a check valve for admitting air into the air chamber, and a check valve carried by the piston permitting flow from the air chamber into the liquid chamber.

4. A device of the character described embodying a cylinder, a piston working therein, a piston rod secured to the piston and slidable through one end of the cylinder, liquid between the piston and the other end of the cylinder, and a compressible air container surrounded by the liquid and having a stem extending through said piston and piston rod.

5. A device of the character described embodying a member having air and liquid chambers therein, a member movable in said member between and separating said chambers, a compressible air container in the liquid chamber, means for admitting air into the air chamber, and means for the inflation of said container.

In testimony whereof I have signed my name to this specification in the presence of two subscribing witnesses.

JESSE D. LANGDON.

Witnesses:
GEO. L. THOMSON,
F. T. WHEELER.